Jan. 2, 1945.   P. F. SHIVERS   2,366,566
TEMPERATURE COMPENSATOR FOR PRESSURE RESPONSIVE DEVICES
Filed May 18, 1942
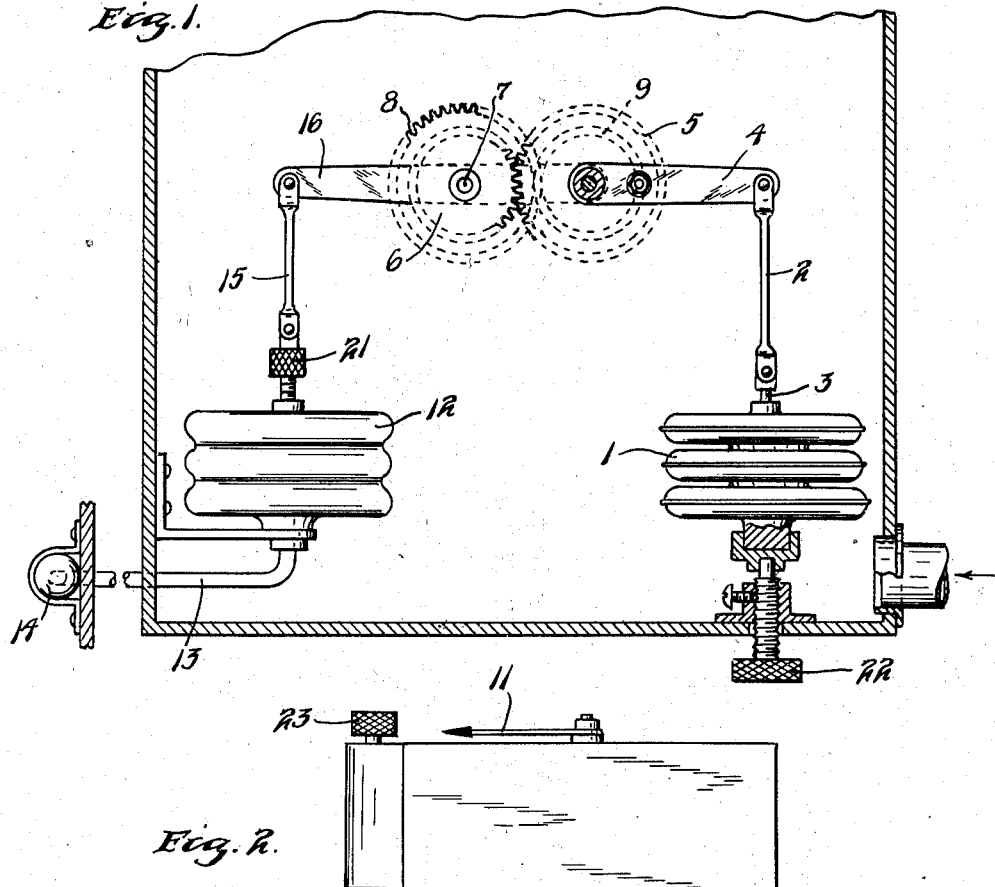
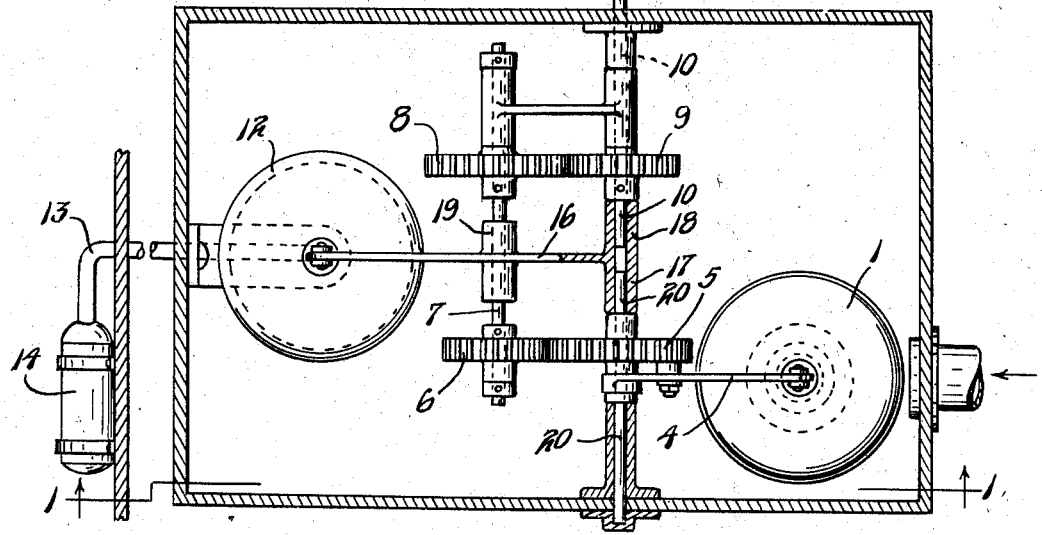
INVENTOR.
PAUL F. SHIVERS
BY
George H Fisher
ATTORNEY Patented Jan. 2, 1945

2,366,566

UNITED STATES PATENT OFFICE 2,366,566

TEMPERATURE COMPENSATOR FOR PRESSURE RESPONSIVE DEVICES

Paul F. Shivers, Edina, Minn., assignor to Minneapolis-Honeywell Regulator Company, Minneapolis, Minn., a corporation of Delaware Application May 18, 1942, Serial No. 443,534

9 Claims. (Cl. 73—386)

My present invention relates generally to atmospheric pressure correlated devices for the measurement of altitude, and more particularly to such devices having means for compensating for atmospheric pressure variations from standard due to changes in the temperature of the air column or to air columns of different temperature.

As is well known in the art, a change in the mass temperature of a column of air, or a column of air of different temperature will vary the atmospheric pressure exerted upon the measuring instrument at a given altitude level. This phenomenon has been attributed to the natural expansion of the air column upon an increase in the mass atmospheric temperature thereof.

Thus, in order to compensate for the effect of the temperature upon the atmospheric pressure, as is well known in the art, corrections in the standard indicated altitude are made in accordance with the following equation:

$$H_t = \frac{Tma}{Tms}(H_i - H_o) \pm H_o$$

In the foregoing equation, $H_t$ equals the true altitude, $H_i$ equals the indicated altitude, $H_o$ equals the ground altitude for which the barometric scale is set to give indicated sea level pressure; $Tma$ is the actual mean temperature, in degrees absolute of the air between altitude H and altitude $H_o$; and $Tms$ is the standard mean temperature, in degrees absolute, of the air between altitude H and altitude $H_o$.

A study of this equation will show that the lower the temperature in relation to the standard, the lower the actual altitude in relation to the indicated altitude. Thus, in order for the measuring instruments of such a variable factor as the atmospheric pressure to properly reflect the true altitude from such pressure, it is necessary that a compensating means be employed for correcting the atmospheric temperature variations in pressure.

It is an object of my invention, therefore, to provide a simple and inexpensive means for readily compensating for pressure variations from standard due to difference in temperature.

Another object of my invention is to provide a simple planetary gear arrangement whereby compensation for the temperature of the free atmospheric air may be easily and accurately effected.

A further object of my invention is to provide a gear arrangement whereby the temperature responsive member may advance or retard the actuation of the altitude indicator hand by the atmospheric pressure responsive device so as to compensate for temperature variations in the free atmospheric air in such a manner that the indicator means may more accurately approximate the true altitude.

Other objects and advantages of this invention are set forth in the following description, taken with the accompanying drawing; and the novel features thereof are pointed out in the appended claims. The disclosure, however, is illustrative only and I may make changes in detail, especially in matters of shape, size and arrangement of parts within the principle of the invention, to the full extent indicated by the broad and general meanings of the terms in which the appended claims are expressed.

In the accompanying drawing wherein like reference characters indicate corresponding parts in the respective figures:

Figure 1 is a sectional view of a temperature compensating means embodying my invention, taken along the lines 1—1 of Figure 2 and looking in the direction of the arrows, and Figure 2 is a plan view of the temperature compensating device with the top and certain parts broken away for illustration.

In the embodiment of my invention illustrated in Figures 1 and 2, there is provided an atmospheric pressure responsive device such as the aneroid 1 of conventional type. Actuated by movement of the aneroid 1 is a rod 2 connected at one end to the said aneroid by a nipple 3. The rod 2 engages at the opposite end an actuating arm 4 suitably fastened to an initial gear 5 rotatably mounted by an axle 20.

Intermeshing with the gear 5 is an intermediary gear assembly comprising a gear 6 fastened to an axle 7 and adapted to turn a gear 8. This in turn, intermeshes with a final gear 9. The said gear 9 is fixedly mounted on an indicator drive shaft 10 and is adapted to actuate a suitable indicator gear arrangement well known in the art so as to position the indicator hand 11 on a conventional altitude dial scale. Thus, upon the rise or fall of the atmospheric pressure due to change in altitude, the resulting movements therefrom of the aneroid 1 will be mechanically transmitted through the gear arrangement noted to the indicator arm 11 for suitably positioning the same to indicate the altitude.

In order to compensate such movements of the aneroid 1 due to change in atmospheric pressure through causes other than a change in altitude such as an increase or decrease in temperature of the air column, a temperature responsive member 12 is provided. The temperature responsive member 12 is of the fluid bellows type well known in the art. The lower end of the temperature responsive member 12 has connected thereto a flexible connection 13 formed of tubular material which connects remotely with a free air thermometer bulb element of the distance type indicated by numeral 14. Connected at the upper end of the temperature responsive member 12 is an actuating rod 15 adapted to convey any movement of the member 12 to the planetary gear actuating arm 16. The actuating arm 16 is pivotally mounted at 17 and 18 on the ends of the axles 20 and 10 respectively.

The axle 7 previously noted, is rotatably mounted at 19 in the said arm 16 so that upon pivotal movement of the arm 16 planetary movement of the gears 8 and 6 may be effected relative to gears 5 and 9. It will thus be seen that upon upward movement of the aneroid 1 in response to a decrease in atmospheric pressure a counter-clockwise movement will be imparted to the gear 5. This counter-clockwise movement of the gear 5 will move the gear 6 in a clockwise direction. However, upon the downward movement of the rod 15 caused by the contraction of the temperature responsive member 12 in response to a decrease in temperature, the arm 16 will cause counter-clockwise planetary movement of gears 6 and 8 about gears 5 and 9 respectively, imparting counter-clockwise rotation round axle 7 to gears 6 and 8. Such counter-clockwise rotation of gear 6 will retard the clockwise movement conveyed to the gear 6 by the gear 5.

The planetary gears 6 and 8 are so arranged as to have different gear ratios with respect to gears 5 and 9 respectively. Therefore, if the arm 16 is alone moved, the planetary movement of the gear 6 will impart a rotary movement to the gear 8 which in turn, will cause movement of the gear 9.

In the event arms 16 and 4 are concurrently moved, the rotary movement imparted to gear 8 will represent the resultant of the movement imparted to gear 6 by arm 16 and the rotary movement conveyed to gear 6 by movement of the gear 5 through arm 4. If the arms are moved in opposite directions, the movement of the one will tend to compensate for the movement of the other.

The aneroid 1 and the temperature responsive member 12 are so arranged that if in lateral flight the same are actuated by pressure and temperature respectively, in accordance with the standard, the indicated altitude will closely approximate the true altitude. However, upon the temperature decreasing below that of the standard, the movement of the arm 16 will cause the retardation of the indicator hand 11 in response to movement of the arm 4 as previously explained. On the other hand, if the temperature be above that of the standard for the atmospheric pressure in question, the arm 16 will convey a clockwise planetary movement to the gear 6. This clockwise planetary movement of the gear 6 will convey a clockwise rotary movement thereto which will add to the clockwise movements imparted by the gear 5 due to the upward movement of the arm 4. Thus, under conditions of high temperature the indicated altitude will be increased while under conditions of low temperature the indicated altitude will be decreased. Thus, variations in the atmospheric air pressure due to the contraction or expansion of the air column will be properly compensated. By a proper selection of the ratio values of the gears 5, 6, 8 and 9 in relation to the bellows travel under temperature changes and proper selection and adjustment of the temperature and the pressure responsive members 12 and 1, respectively, the compensation effected for the changes in question in temperature will cause the indicator means to closely approximate the true altitude. It will thus be seen that a very simple, inexpensive and convenient means has been provided for compensation of ambient air temperatures.

The adjustment means 23 is provided of conventional type for convenient manual adjustment of the indicator dial scale with respect to the indicator hand 11 in a manner well known in the art. Also, there is provided the adjustment means 21 and 22 whereby the device may be readily adjusted for variance in the temperature and atmospheric pressure respectively, at the ground level.

While only one embodiment of the invention has been described and illustrated in the drawing, it will be understood that the invention is not limited thereto but is capable of a variety of mechanical forms and that changes may be made in the form, details of construction and arrangements of the parts without departing from the spirit of invention. Reference should therefore be had to the appended claims for a definition of the present invention.

I claim as my invention:

1. In a device operatively correlated with atmospheric conditions, planetary gear means, initial gear means for causing motion of said planetary gear means, second means for independently causing motion of said planetary gear means, means actuating said initial gear means in response to changes in atmospheric pressure, means actuating said second means in response to changes in atmospheric temperature, an operated member, and gear means rotatively actuating said operated member in accordance with the motion of said planetary gear means.

2. In a device operatively correlated with atmospheric conditions, initial gear means, an operated member, final gear means rotating said operated member, planetary gear means adjustably transmitting rotation of said initial gear means to said final gear means, means rotating said initial gear means in response to changes in atmospheric pressure, means mechanically responsive to changes in atmospheric temperature, and means modifying, in accordance with change in atmospheric temperature, the rotation transmitted by said planetary gear means from said initial gear means to said final gear means, said modifying means including means connecting said mechanically responsive means with said planetary gear means for adjustment thereof.

3. In a device operatively correlated with atmospheric conditions, first sensitive means responding to changes in atmospheric pressure, initial gear means responsively rotated by said first means, an operated member, final gear means rotating said member, planetary gear means transmitting rotation of said initial gear means to said final gear means, second sensitive means responding to changes in atmospheric temperature, and means responsively actuated by said second means and effective upon said planetary gear means to modify the rotation transmitted from said initial gear means.

4. In a device operatively correlated with atmospheric conditions, first sensitive means responding to changes in atmospheric pressure, initial gear means responsively rotated by said first means, an indicator, final gear means rotating said indicator, planetary gear means transmitting rotation of said initial gear means to said final gear means, second sensitive means responding to changes in atmospheric temperature, and means responsively actuated by said second means and effective upon said planetary gear means to selectively increase and decrease the rotation transmitted from said initial gear means.

5. In a device operatively correlated with atmospheric conditions, first sensitive means responding to changes in atmospheric pressure, initial gear means responsively rotated by said first means, an indicator, final gear means rotating said indicator, plantary gear means transmitting rotation of said initial gear means to said final gear means, second sensitive means responding to changes in atmospheric temperature, and means responsively actuated by said second means and effective upon said planetary gear means to selectively increase and decrease the rotation transmitted from said initial gear means, said planetary gear means comprising a pair of gears respectively engaging said initial gear means and said final gear means and means rotatively connecting the gears of said pair.

6. In a device operatively correlated with atmospheric conditions, first sensitive means responding to changes in atmospheric pressure, initial gear means responsively rotated by said first means, an indicator, final gear means rotating said indicator, planetary gear means transmitting rotation of said initial gear means to said final gear means, second sensitive means responding to changes in atmospheric temperature, and means responsively actuated by said second means and effective upon said planetary gear means to selectively increase and decrease the rotation transmitted from said initial gear means, said planetary gear means comprising a pair of gears respectively engaging said initial gear means and said final gear means and means rotatively connecting the gears of said pair, the ratios between gears of said pair and said initial and final gear means respectively being different.

7. In a device operatively correlated with atmospheric conditions, first sensitive means responding to changes in atmospheric pressure, initial gear means responsively rotated by said first means, an indicator, final gear means rotating said indicator, intermediary gear means transmitting rotation of said initial gear means to said final gear means, second sensitive means responding to changes in atmospheric temperature, and means responsively actuated by said second means and effective upon said intermediary gear means to selectively increase and decrease the rotation transmitted from said initial gear means, said initial gear means and said final gear means being co-axial, said intermediary gear means comprising a pair of gears unitarily rotatable and means rotatively connecting the gears of said pair.

8. In a device operatively correlated with atmospheric conditions, first sensitive means responding to changes in atmospheric pressure, initial gear means responsively rotated by said first means, an indicator, final gear means rotating said indicator, intermediary gear means transmitting rotation of said initial gear means to said final gear means, second sensitive means responding to changes in atmospheric temperature, and means responsively actuated by said second means and effective upon said intermediary gear means to selectively increase and decrease the rotation transmitted from said initial gear means, said initial gear means and said final gear means being co-axial, said intermediary gear means comprising a pair of unitarily rotatable gears, the ratios between gears of said pair and said initial gear means and said final gear means respectively being different.

9. In a device operatively correlated with atmospheric conditions, initial gear means, an operated member, final gear means actuating said operated member, said initial gear means and said final gear means having a common axis, intermediary gear means transmitting rotation of said initial gear means to said final gear means, means actuating said initial gear means in response to changes in atmospheric pressure, means mechanically responsive to changes in atmospheric temperature, and means modifying, in accordance with change in atmospheric temperature, the rotation transmitted by said intermediary gear means from said initial gear means to said final gear means, said intermediary gear means comprising a pair of gears unitarily rotatable about a second axis, said modifying means comprising means causing rotation of said second axis about said common axis and means connecting said last named means with said mechanically responsive means for actuation thereby.

PAUL F. SHIVERS.